US006456695B2

(12) United States Patent
Lee

(10) Patent No.: US 6,456,695 B2
(45) **Date of Patent: *Sep. 24, 2002**

(54) COMPUTER HAVING EMERGENCY CALLING FUNCTION AND EMERGENCY CALLING METHOD USING COMPUTER

(75) Inventor: Joon Lee, Yongin (KR)

(73) Assignee: Samsung Electronics, Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,615

(22) Filed: Sep. 7, 1999

(30) Foreign Application Priority Data

Sep. 4, 1998 (KR) ........................................... 98-36496

(51) Int. Cl.[7] ............................................. H04M 11/00
(52) U.S. Cl. ............................. 379/41; 379/37; 379/40
(58) Field of Search ............................ 379/40, 41, 46, 379/38, 39, 102.04, 93.17

(56) References Cited

U.S. PATENT DOCUMENTS 4,647,721 A * 3/1987 Busam et al. .......... 379/102.04
4,964,065 A 10/1990 Hicks et al.
5,061,916 A 10/1991 French et al.
5,086,391 A 2/1992 Chambers
5,134,644 A 7/1992 Garton et al.
5,343,509 A * 8/1994 Dounies ...................... 379/40
5,396,443 A 3/1995 Mese et al.
5,416,725 A 5/1995 Pacheco et al.
5,446,445 A 8/1995 Bloomfield et al.
5,510,907 A * 4/1996 Koichi ........................ 379/40
5,543,778 A 8/1996 Stouffer
5,686,885 A 11/1997 Bergman
5,793,840 A * 8/1998 Zhuang et al. ................ 379/41
5,861,804 A 1/1999 Fansa et al.
5,978,923 A * 11/1999 Kou ........................... 713/323
6,028,915 A * 2/2000 McNevin ..................... 379/40
6,104,783 A * 8/2000 DeFino ........................ 379/38

FOREIGN PATENT DOCUMENTS

KR 1995/025562 9/1995

OTHER PUBLICATIONS

English language translation of Notice to Submit Reponse, in KR Priority Application No. 1998/003496, on Sep. 7, 2001.

English language translation of Korean Patent Abstracts, for Korean Patent Application No. 1995/025562, on Sep. 18, 1995.

* cited by examiner

*Primary Examiner*—Stella Woo
(74) *Attorney, Agent, or Firm*—Robert E. Bushnell, Esq.

(57) ABSTRACT

In a computer having an emergency calling function for detecting an emergency situation and for transferring an emergency call message previously set by a user to a preset emergency call telephone number, a non-volatile memory stores information which is not lost if power is turned off. A message/telephone number setter receives an emergency call message indicating an emergency situation and an emergency call telephone number which are input by a user and stores the received message and number in the non-volatile memory. An emergency call button generates an emergency detection signal when the user presses an emergency call button. A microprocessor receives the emergency detection signal from the emergency call button and restores the computer from a power-save state or a power-off state to a normal state. An emergency call controller reads the emergency call message and emergency call telephone number from the non-volatile memory and makes a telephone call to the emergency call telephone number to transfer the emergency call message, after an operational state of the computer has been restored to a normal state by the microprocessor.

27 Claims, 6 Drawing Sheets

COMPUTER HAVING EMERGENCY CALLING FUNCTION AND EMERGENCY CALLING METHOD USING COMPUTER

This application makes reference to, incorporates the same herein, and claims all benefits accruing under 35 U.S.C. §119 from my application COMPUTER HAVING EMERGENCY CALLING FUNCTION AND EMERGENCY CALLING METHOD USING COMPUTER filed with the Korean Industrial Property Office on Sep. 4, 1998 and there duly assigned Serial No. 36496/1998.

BACKGROUND OF THE INVENTION

1. Field of the Invention

The present invention relates to a computer, and more particularly, to a computer having an emergency calling function, and to an emergency calling method using a computer.

2. Description of the Related Art

Computers at home have been usually used for the purposes of personal business, education or entertainment. However, as computer-related technologies have been continuously developed, the function and use of computers has become more diverse utilizing computer hardware's high performance.

Meanwhile, for an emergency case such as a fire or a burglar breaking into a home, or for an urgent need for medical assistance by a family member at home, an emergency call system for contacting an appropriate organization or person should be provided at the home. However, to additionally equip such an emergency call system at home requires a considerable cost.

The following patents each discloses features in common with the present invention: U.S. Pat. No. 5,861,804 to Fansa et al., entitled COMPUTER CONTROLLED SECURITY AND SURVEILLANCE SYSTEM, issued on Jan. 19, 1999, U.S. Pat. No. 5,134,644 to Garton et al., entitled DATA COMMUNICATION DEVICE, issued on Jul. 28, 1992, U.S. Pat. No. 4,964,065 to Hicks et al., entitled COMPUTER-CONTROLLED ELECTRONIC SYSTEM MONITOR, issued on Oct. 16, 1990, U.S. Pat. No. 5,686,885 to Bergman, entitled SENSOR TEST METHOD AND APPARATUS, issued on Nov. 11, 1997, U.S. Pat. No. 5,543,778 to Stouffer, entitled SECURITY SYSTEM, issued on Aug. 6, 1996, U.S. Pat. No. 5,446,445 to Bloomfield et al., entitled MOBILE DETECTION SYSTEM, issued on Aug. 29, 1995, U.S. Pat. No. 5,061,916 to French et al., entitled EVENT DRIVEN REMOTE GRAPHICAL REPORTING OF BUILDING AUTOMATION SYSTEM PARAMETERS, issued on Oct. 29, 1991, and U.S. Pat. No. 5,086,391 to Chambers, entitled REMOTE CONTROLLER FOR ACTIVATING SPEECH MESSAGES AND FOR CONTACTING EMERGENCY SERVICES, issued on Feb. 4, 1992.

SUMMARY OF THE INVENTION

To solve the above problem, it is an object of the present invention to provide a computer which can simply inform an appropriate organization or person of an emergency situation, and an emergency calling method using a computer.

Accordingly, to achieve the above object, there is provided an emergency call apparatus in a computer comprising: an emergency detector for detecting an occurrence of an emergency situation and for generating an emergency detection signal; normal-state restorer for receiving the emergency detection signal from the emergency detector and for restoring the computer from a power-save state or a power-off state to a normal state; and an emergency caller for transferring a predetermined emergency call message using a preset emergency call telephone number after the operational state of the computer is restored by the normal-state restorer to a normal state.

Also, to achieve the above object, there is provided a computer having an emergency call function for detecting an emergency situation and for transferring an emergency call message previously set by a user to a preset emergency call telephone number, the computer comprising: a non-volatile memory for storing information which is not lost if power is turned off; a message/telephone number setter for receiving an emergency call message indicating an emergency situation and an emergency call telephone number which are input by a user and for storing the received message and number in the non-volatile memory; an emergency call button for generating an emergency detection signal when the user presses an emergency call button; a microprocessor for receiving the emergency detection signal from the emergency call button and restoring the computer from a power-save state or a power-off state to a normal state; and an emergency call controller for reading the emergency call message and emergency call telephone number from the non-volatile memory and for making a telephone call to the emergency call telephone number to transfer the emergency call message, after an operational state of the computer is restored to a normal state by the microprocessor.

To achieve another aspect of the present invention, there is provided an emergency calling method using a computer having an emergency call button, the method comprising the steps of: storing an emergency call telephone number and an emergency call message in an auxiliary memory of the computer; pressing the emergency call button; if an operational state of the computer is in a power-save state or a power-off state, restoring the computer to a normal state; making a telephone connection to the emergency call telephone number stored in the auxiliary memory; and transferring the emergency call message.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
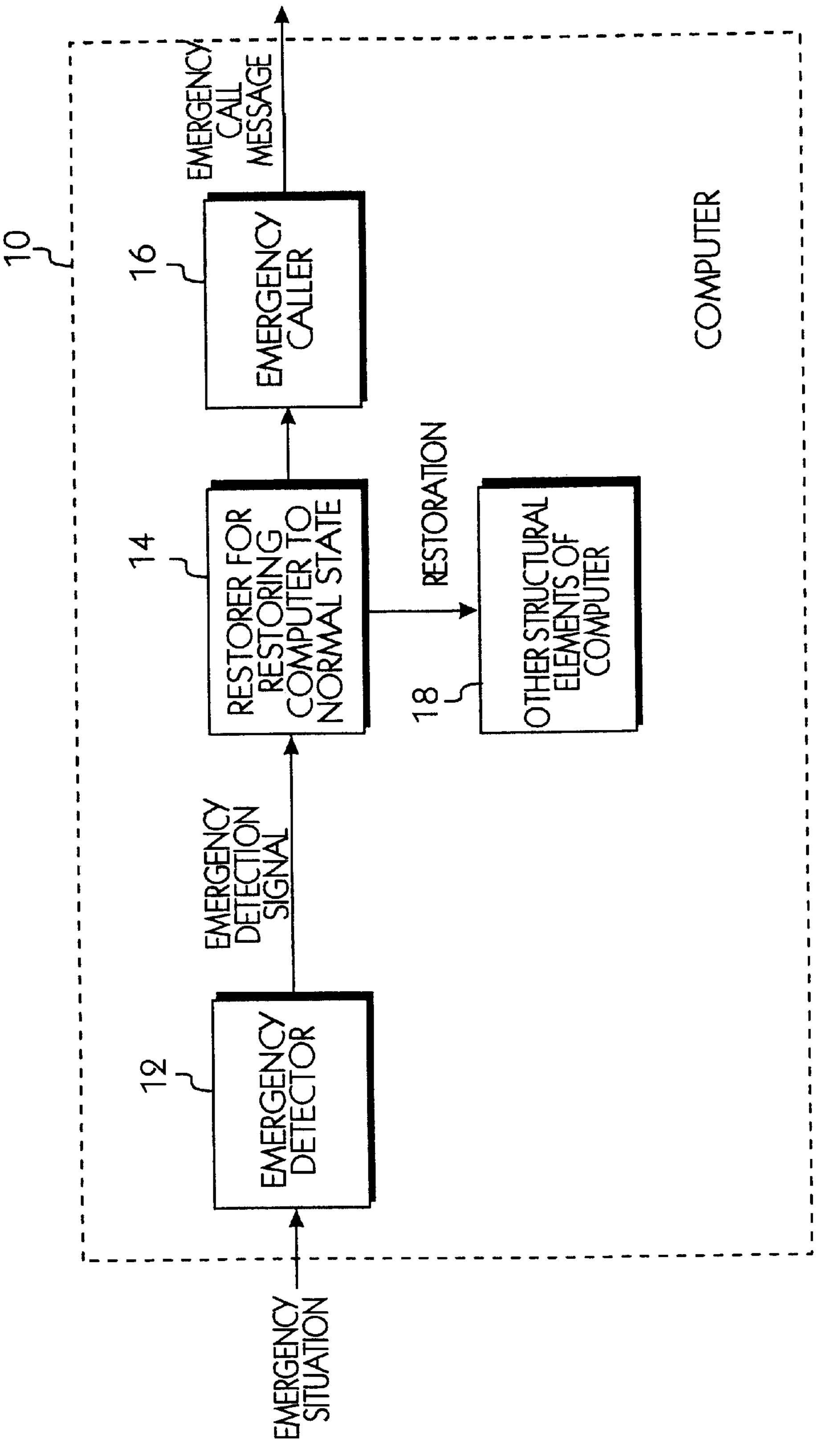
FIG. 1 is a block diagram showing a structure of an emergency call apparatus in a computer according to the present invention.

Referring to FIG. 1, an emergency call system in a computer 10 according to the present invention includes an emergency detector 12, a restorer 14 for restoring the computer to a normal state 14, and an emergency caller 16.

The emergency detector 12 detects an emergency situation and generates an emergency detection signal. The restorer 14 for restoring the computer to a normal state receives the emergency detection signal from the emergency detector 12 and checks the operational status of the computer 10. If the computer 10 is in a power-save state or is turned off, the restorer 14 restores other structural elements 18 of the computer 10 to a normal state. When the computer 10 returns to a normal state, the emergency caller 16 tries to contact a previously set emergency call number and transmits a predetermined emergency call message after the telephone connection is made.

Figure 2:
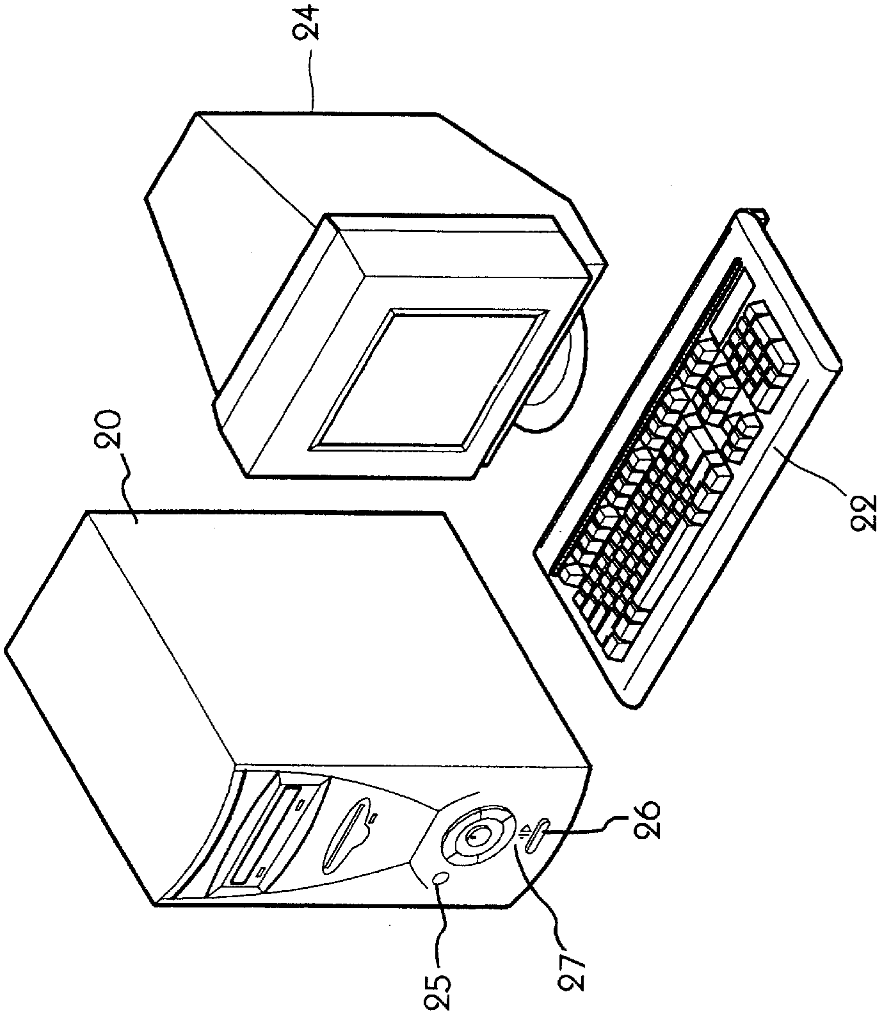
FIG. 2 is a perspective view illustrating a computer having an emergency calling function according to the present invention.

FIG. 2 shows the appearance of a computer having an emergency calling function according to the present invention. The computer consists of a main body 20 and input/output devices such as a keyboard 22 and a monitor 24. Also, a power button 25, an emergency call button 26, and an emergency call LED 27 are installed at the front side of the main body 20.

Figure 3:
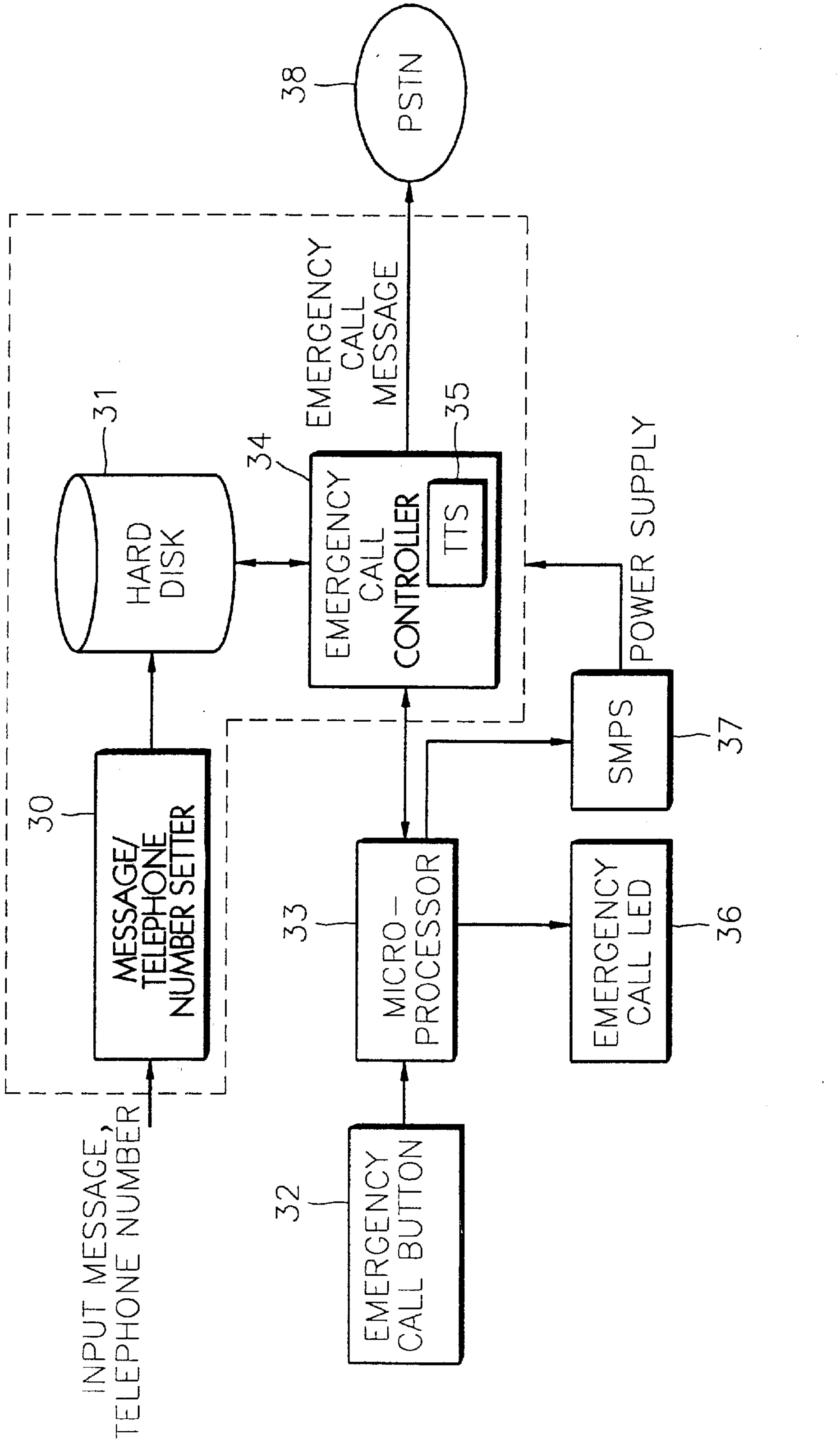
FIG. 3 is a block diagram showing a functional configuration of a computer having an emergency calling function according to the present invention.

FIG. 3 shows the structure of the computer having an emergency calling function according to the present invention. The computer, as shown in the drawing, includes a message/telephone number setter 30, a non-volatile memory 31, an emergency call button 32, a microprocessor 33, an emergency call controller 34, and an emergency call display, such as an LED, 36.

The non-volatile memory is a memory in which the recorded contents are not lost if power is turned off. In a preferred embodiment of the present invention, a hard disk 31 is used.

The message/telephone number setter 30 is a joint unit of a message/telephone number setting software module, a memory, and a central processing unit. The message/telephone number setting software module receives an emergency call message informing of an emergency situation and a telephone number for an emergency call from a user and stores the information on the hard disk 31. The message/telephone number setting software module is loaded in the memory and processed by the central processing unit.

The emergency call button 26 is installed at the front side of the main body 20 of the computer, as shown in FIG. 2, and generates an emergency detection signal when a user presses the button.

The microprocessor 33 receives the emergency detection signal of the emergency call button 26 and checks the operational status of the computer. The operational status of the computer can be any one of a normal state (a G0 state for a system adopting an ACPI (Advanced Configuration Power Interface)specification), a power-save state (a G1 state for a system adopting an ACPI specification), and a power-off state (a G2 or G3 state for a system adopting an ACPI specification). When the computer is in the power-save state, the microprocessor 33 generates a wake-up signal to restore the computer to a normal state. When the computer is in the power-off state, the microprocessor 33 controls a switching mode power supply (SMPS) 37 to supply the power and makes the computer boot up so as to restore the computer to a normal state.

The emergency call controller 34 is an assembly of an emergency call control software module, a memory where the emergency call control software module is loaded, and a CPU for operating the emergency call control software module. The emergency call control software module reads the emergency call message and telephone number from the hard disk 31, after the operational state of a computer is restored to a normal state by the microprocessor 33, and makes a call to the emergency call telephone number via the public switched telephone network (PSTN) 38 to transfer the emergency call message.

Also, the emergency call controller 34 is provided with a text-to-speech (TTS) converter 35 and transmits the emergency call message read from the hard disk 31 by converting the same to a voice message. Further, the emergency call controller 34 informs the microprocessor 33 of information on whether the telephone is connected and the emergency call message is transferred and displays the operational state of the emergency call function of a computer via an emergency call display. In a preferred embodiment of the present invention, the emergency call display is embodied by a light emitting diode (LED) 36 for indicating an emergency call which is installed on an outer surface of the main body of the computer shown as reference 27 in FIG. 2. The emergency call LED 36 begins to flash in red when the microprocessor 33 starts to check the operational state of the computer. Then, when the microprocessor 33 receives a signal indicating that a telephone call is made from the emergency call controller 34, the emergency call LED 36 stops flashing and continuously lights up in red. When the microprocessor 33 receives a signal indicating that all emergency call messages are transferred from the emergency call controller 34, the emergency call LED 36 stops lighting up.

The message/telephone number setting software module forming the message/telephone number setter 30 and the emergency call control software module forming the emergency call controller 34 are included in software named "Integrated Secretary" operating in a computer according to the present invention.

Figure 4:
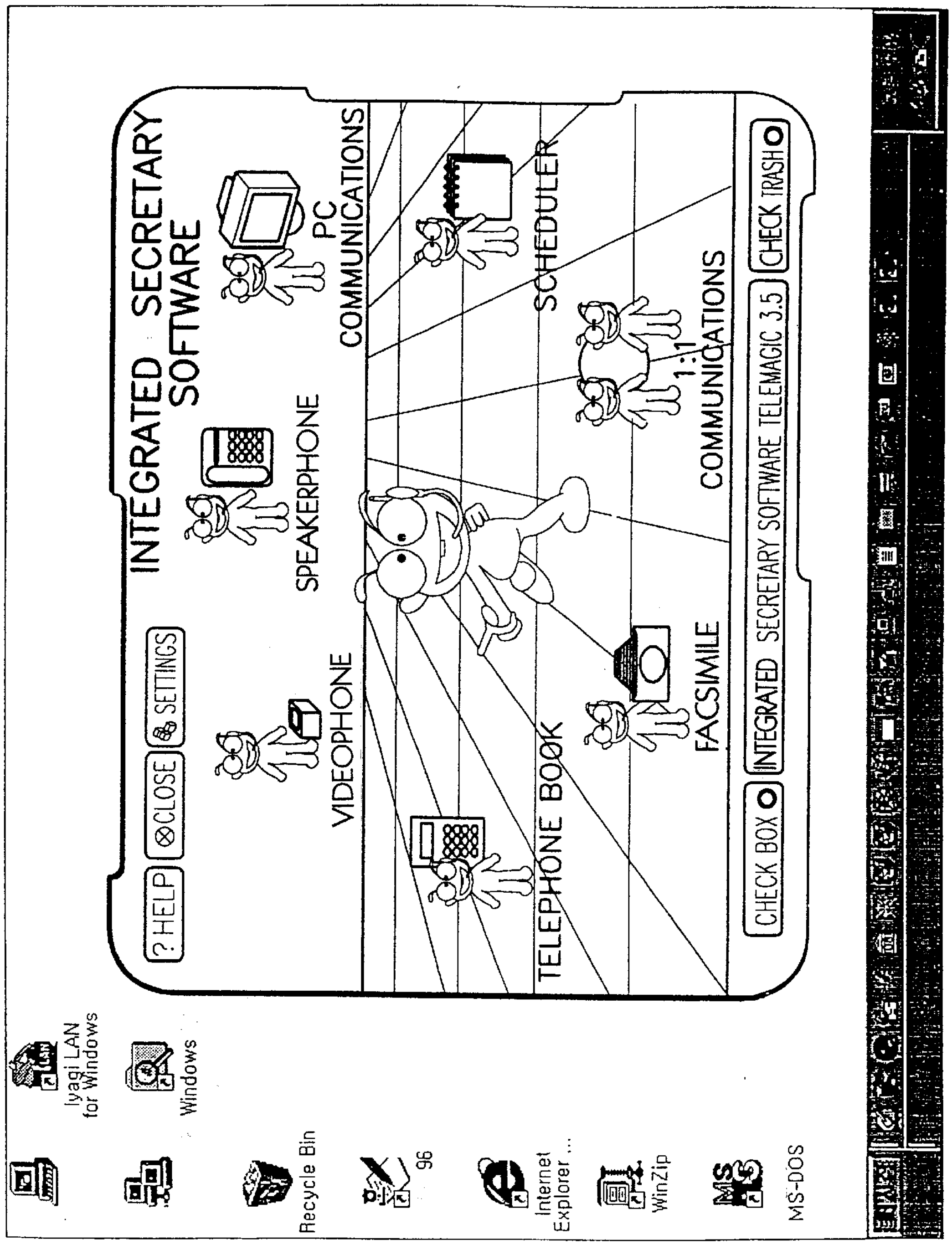
FIG. 4 is a view showing an initial screen shot of a program named "Integrated Secretary"

As shown in FIG. 4, on an initial screen of the Integrated Secretary software, icons indicating software modules embodying functions such as a speakerphone, PC communications, a scheduler, 1:1 communications, a facsimile, a telephone book, and a videophone are shown. The message/telephone number setting software module forming the message/telephone number setter 30 displays an emergency call setting window of FIG. 5 when a user clicks a button for settings shown in FIG. 4 and selects an emergency call from a setting window.

Figure 5:
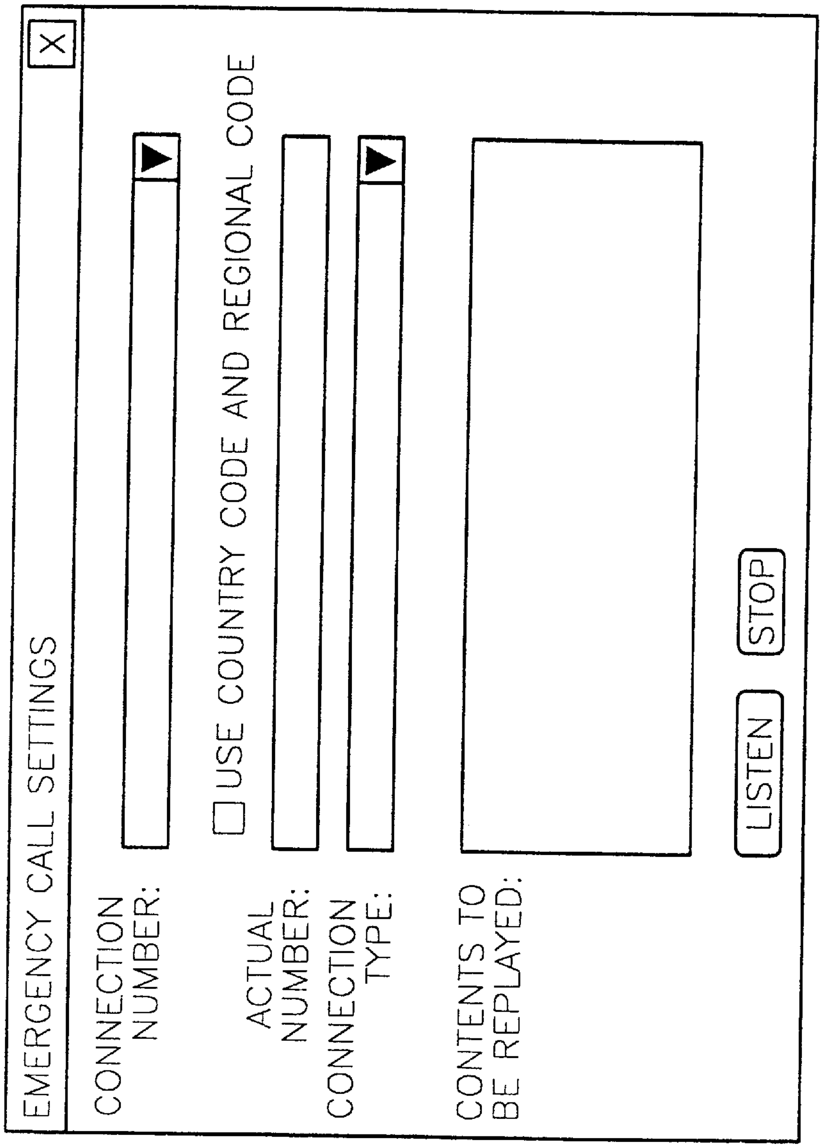
FIG. 5 is a view showing a window for entering the settings for an emergency call.

In the emergency call setting window of FIG. 5, a connection number is for inputting a telephone number to be connected to when an emergency situation occurs. A user can input a multitude of telephone numbers through the connection number item. If the telephone number input by the user does not include a country code and a regional code, the Integrated Secretary software automatically adds and displays the county code and regional code in a section indicating an actual number. In a section for a connection type, a use selects whether to input a voice emergency call message or to input a text emergency call message and converts the same to a voice emergency call message using the TTS. The user can input a text emergency call message in a section for contents to be replayed. If the user clicks the listen button, the input voice emergency call message or the voice emergency call message converted by the TTS is output through a speaker.

The emergency call control software module forming the emergency call controller 34 automatically operates without permission of the user when the emergency detection signal is generated and restores the computer to a normal state.

Figure 6:
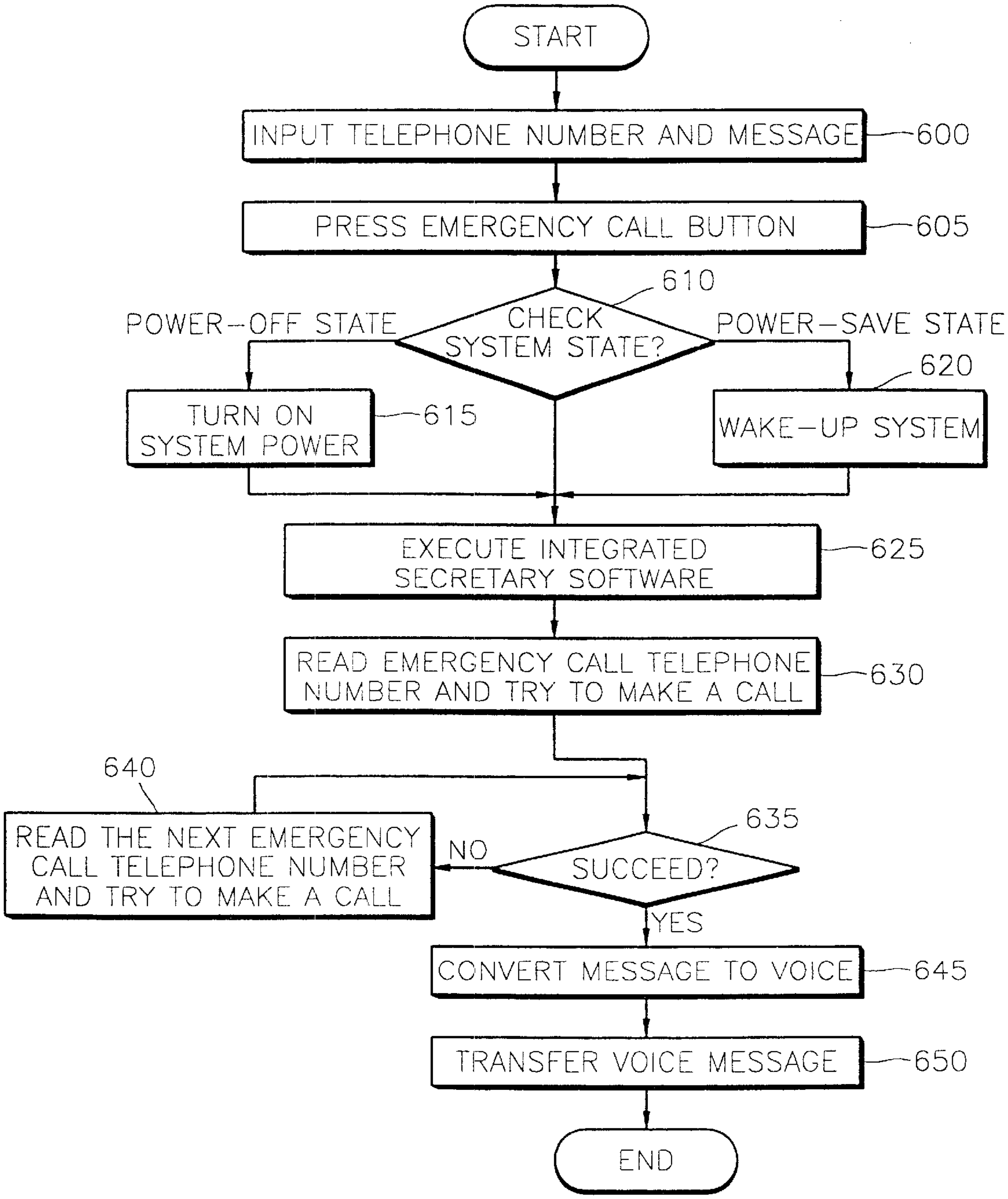
FIG. 6 is a flowchart for explaining a process of an emergency call using a computer according to the present invention.

Referring to FIGS. 3 and 6, the process of emergency call using the computer according to the present invention will be described.

A user, as shown in FIG. 5, inputs an emergency call telephone number and an emergency call message through the emergency call setting window as shown in FIG. 5 and stores the information on a hard disk (step 600). When an emergency situation occurs and the user presses the emergency call button 26 (see FIG. 2), the state of the computer system is checked (steps 605 and 610). At this time, the emergency call LED 36 flashes in red.

When the operational state of the computer is in a power-off state, power is supplied to every component of the computer by the SMPS 37 and the computer is booted up (step 615). If the computer is in a power-save state, the computer is woken up (step 620).

After the computer is restored to a normal state, the Integrated Secretary software is executed (step 625). The emergency call control software module included in the Integrated Secretary software reads an emergency call telephone number from the hard disk and tries to make a telephone connection (step 630). If the connection to the telephone number is not made, the next telephone number is consecutively read from the hard disk and the above process is repeated until a connection is made (steps 635 and 640).

When the telephone connection is made, the text message is transferred by being converted into voice and the voice message is transferred as it is (steps 645 and 650).

Meanwhile, according to preferred embodiments of the present invention, the message/telephone number setter 30, instead of the emergency call controller 34, can include the TTS and convert the text emergency call message input by the user to a voice emergency call message to store the message on a hard disk.

As described above, according to the present invention, when an emergency situation occurs, a user can inform a desired message to an appropriate person or an organization with a simple manipulation using a computer.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An emergency call apparatus in a computer, comprising:

an emergency detector for detecting an occurrence of an emergency situation and for generating an emergency detection signal;

a normal-state restorer for receiving the emergency detection signal from said emergency detector and for restoring said computer from a power-save state or a power-off state to a normal state; and an emergency caller for transferring a predetermined emergency call text message preset by a user of the user's choice using an emergency call telephone number preset by the user after the operational state of said computer has been restored by said normal-state restorer to a normal state.

2. The apparatus of claim 1, further comprising a power button on said computer, wherein said emergency detector is a button on said computer separate from said power button.

3. The apparatus of claim 1, further comprising a light emitting diode disposed on said computer, said light emitting diode flashes on and off when said normal state restorer restores said computer from said power-save or power-off state to said normal state, and said light emitting diode being continuously lit up when said emergency call is being made.

4. The apparatus of claim 1, said computer further comprising a text to voice converter converting said emergency call text message into an emergency call voice message.

5. The apparatus of claim 4, said computer being connected to a public switched telephone network conveying said emergency call voice message to said emergency call telephone number.

6. The apparatus of claim 1, said computer being connected to a public switched telephone network conveying said emergency call text message to said emergency call telephone number.

7. The apparatus of claim 1, wherein said computer allows entry of a plurality of emergency call telephone numbers preset by a user in case of an unsuccessful telephone connection between said computer and a first input emergency call telephone number of the user's choice.

8. A computer having an emergency calling function for detecting an emergency situation and for transferring an emergency call text message previously set by a user to a preset emergency call telephone number, said computer comprising:

a non-volatile memory for storing information which is not lost if power is turned off;

a message/telephone number setter for receiving an emergency call text message indicating an emergency situation and an emergency call telephone number which are input by a user and for storing the received emergence call text message and the emergency call telephone number in said non-volatile memory;

an emergency call button for generating an emergency detection signal when the user presses an emergency call button;

a microprocessor for receiving said emergency detection signal from said emergency call button and for restoring said computer from a power-save state or a power-off state to a normal state;

an emergency call controller for reading said emergency call text message and emergency call telephone number from said non-volatile memory and for making a telephone call to said emergency call telephone number to transfer said emergency call text message, after an operational state of said computer has been restored to a normal state by said microprocessor; and a text/voice converter for converting said emergency call text message into a voice message.

9. The computer as claimed in claim 8, said emergency call controller comprising a text/voice converter for converting said emergency call message to a voice message.

10. The computer as claimed in claim 8, said emergency call controller informing said microprocessor as to whether a telephone connection has been made and said emergency call message has been transferred, and further comprising an emergency call display controlled by said microprocessor for displaying an operational state of said emergency call function of said computer.

11. The computer of claim 10, wherein said display is a light emitting diode disposed on said computer, said light emitting diode flashes on and off when said microprocessor restores said computer from said power-save or power-off state to said normal state, and said light emitting diode being continuously lit up when said emergency call is being made.

12. The computer of claim 8, further comprising a power button on said computer, wherein said emergency call button on said computer is separate from said power button.

13. The computer of claim 8, said computer being connected to a public switched telephone network enabling said voice message to be transferred to said emergency call telephone number.

14. An emergency calling method using a computer having an emergency call button, said method comprising the steps of:

(S1) storing an emergency call telephone number and an emergency call text message of the user's choice which are preset by a user in an auxiliary memory of said computer;

(S2) pressing said emergency call button;

(S3) if an operational state of said computer is in a power-save state or a power-off state, restoring said computer to a normal state;

(S4) making a telephone connection to said emergency call telephone number stored in said auxiliary memory;

(S5) converting said emergency call text message to a voice message; and (S6) transferring said voice message.

15. The emergency calling method as claimed in claim 14, further comprising, in said step (S1), a step of a plurality of emergency call telephone numbers of a user's choice being stored, and in said step (S4), a step of telephone connections to the emergency call telephone numbers read from said auxiliary memory being sequentially tried until a telephone connection is made.

16. The emergency calling method as claimed in claim 14, said step (S5) further comprising the sub-steps of:

(S5-1) converting said emergency call message to a voice message; and (S5-2) transferring said voice message.

17. The method of claim 14, wherein said computer comprises a power on/off button that is separate from said emergency call button.

18. The method of claim 14, wherein said computer comprises a light emitting diode, said light emitting diode flashes on and off in step (S3) while said computer is being restored to said normal state.

19. The method of claim 18, said light emitting diode being continuously lit up during steps (S4) and (S5).

20. The method of claim 14, in said step (S6), said voice is transferred over a public switched telephone network to said emergency call telephone number.

21. A personal computer with emergency calling features enabling a user of said personal computer to call for help, said computer comprising a power on/off button;

an emergency call button separate from said power on/off button;

a modem connected to a public switched telephone network(PSTN);

a text to voice converter; and a memory for storing emergency textual information of a user's choice to be transmitted through said PSTN upon actuation of said emergency call button, a series of telephone numbers to be dialed upon user actuation of said emergency call button and a connection type specifying said emergency message is to be transmitted over said PSTN in voice or in textual format, upon actuation of said emergency call button, said computer being booted up to desktop if not already there before placing said emergency call.

22. The computer of claim 21, if said computer is at desktop and is fully booted prior to pressing said emergency call button, said computer will dial up a first of said series of said telephone numbers stored in said memory and transfer said emergency message over said PSTN to said first telephone number if said first telephone number is not busy, is properly functioning and said PSTN is not overloaded.

23. The computer of claim 22, said computer dialing up a second number in said series of telephone numbers stored in memory if said first telephone number is busy or not functioning properly or the PSTN circuits are overloaded.

24. The computer of claim 21, said connection type indicating whether said textual message of said user's choice is transmitted over said telephone line in textual format or in voice format.

25. The computer of claim 21, each one of said series of telephone numbers stored in said memory being numbers for organizations that help people who are in emergency situations.

26. The computer of claim 25, each one of said series of telephone numbers stored in said memory being telephone numbers selected from the group consisting of police, ambulance and firemen.

27. The computer of claim 21, further comprising an LED that flashes upon actuation of said emergency call button and being steadily lit up during transmission of said emergency message of said user's choice over said PSTN through said modem to one of said series of telephone numbers stored in said memory of said computer.

* * * * *